No. 667,800. Patented Feb. 12, 1901.
H. SLOAN.
BRAKE MECHANISM.
(Application filed Mar. 16, 1900.)
(No Model.) 2 Sheets—Sheet 1.
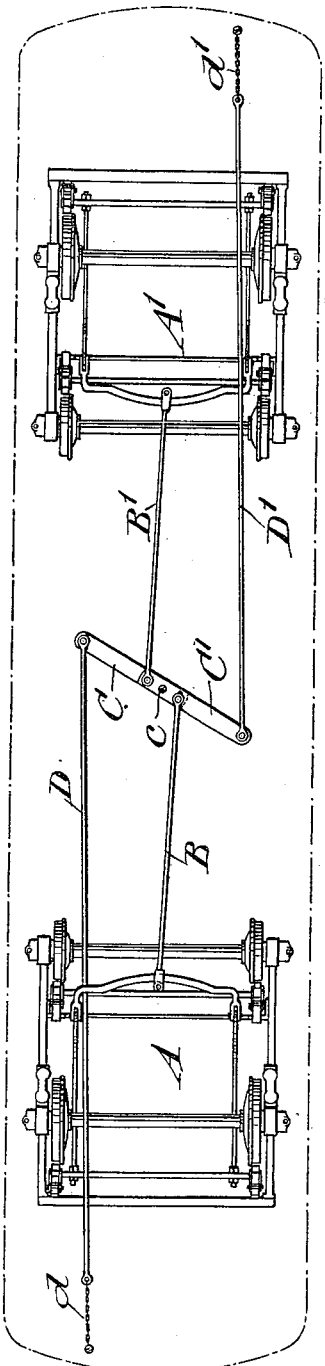
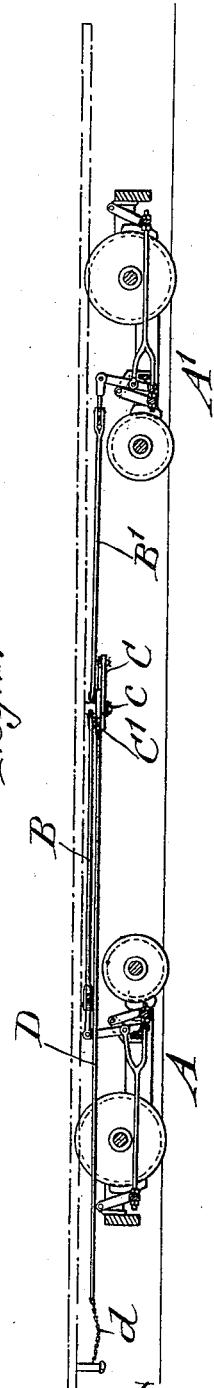
Witnesses:
Edward Vieser
George Barry Jr
Inventor:
Harry Sloan
By Brown & Seward
his Attorneys

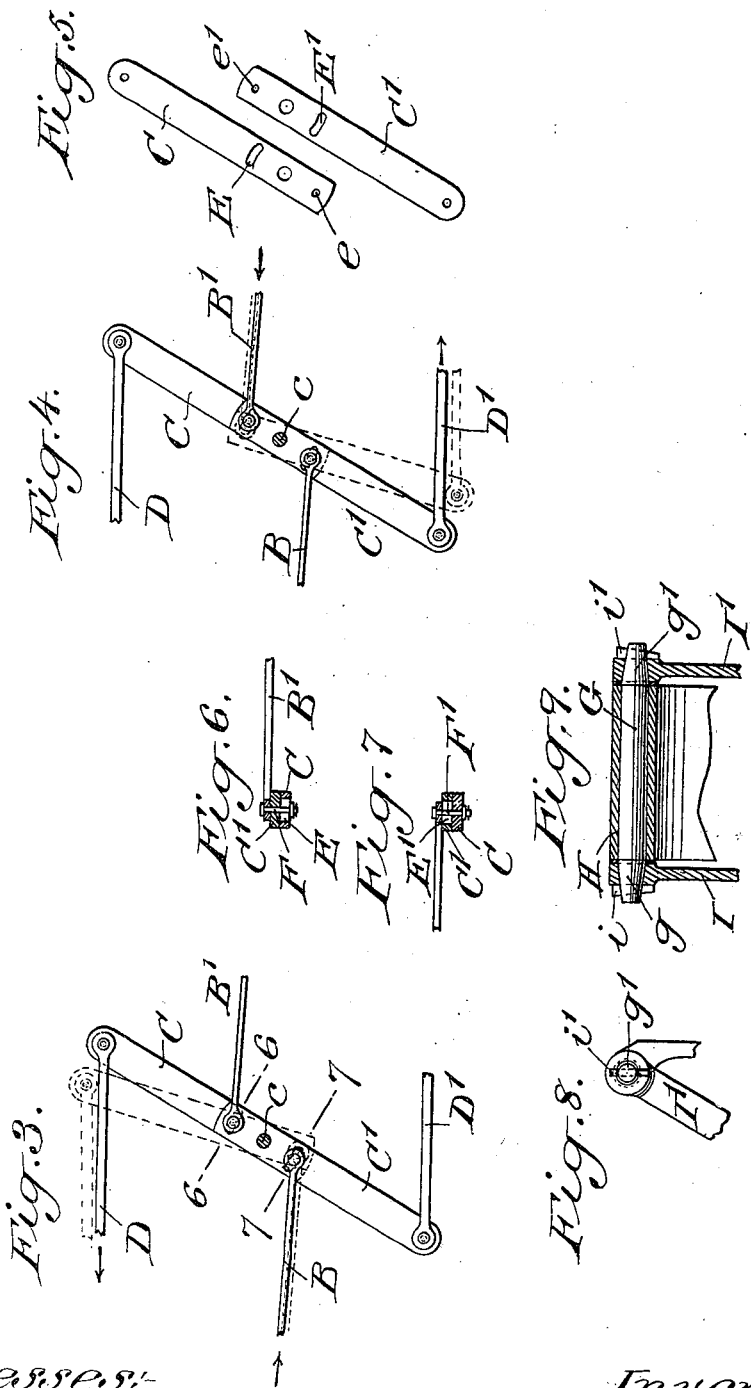

UNITED STATES PATENT OFFICE.

HARRY SLOAN, OF NEW YORK, N. Y.

BRAKE MECHANISM.

SPECIFICATION forming part of Letters Patent No. 667,800, dated February 12, 1901.

Application filed March 16, 1900. Serial No. 8,884. (No model.)

*To all whom it may concern:*

Be it known that I, HARRY SLOAN, a citizen of the United States, and a resident of the borough of Brooklyn, in the city and State of New York, have invented a new and useful Brake Mechanism, of which the following is a specification.

My invention relates to brake mechanism for railway-cars, and more particularly to means for equalizing the pressure upon the wheels of the trucks no matter from which end of the car the brake be operated and for preventing the chattering sound which often proves annoying to the passengers and injurious to the parts. When the brake is applied to a car in motion, the rear end of the car tends to rise and the front end tends to pitch downward. This throws more weight on the front truck and takes weight off the rear truck. If the brake-shoes are applied with equal pressure to the rear and front trucks, the rear wheels will be "skidded"—*i. e.*, held against rotation—before the brake on the front truck has reached its maximum efficiency. Also when the brake is applied the trucks tend to stand still, while the momentum of the car-body carries it forward on the slides until it has taken up all of the lost motion of the king-pin or other fastenings by which the car-body is attached to the trucks. As the equalizer is attached to the car-body, when the latter moves forward on its slides or plates the brake-pressure on the forward truck will be decreased and the braking pressure on the rear truck will be increased. If the brake were always operated from the same end of the car—for example, a trolley-car—it would be a comparatively easy matter to so adjust the brakes as to allow for this pitching forward of the car and increased pressure upon the rear truck; but as the brake is to be in ordinary practice operated from the one end of the car about as often as from the opposite end it becomes important that some means be devised for equalizing this pressure no matter from which end of the car the brake be operated; and it is to the accomplishment of this object and in connection therewith the stopping of the chattering of the parts that my present invention is particularly directed.

A practical embodiment of my invention is represented in the accompanying drawings, in which—

Figure 1 is a top plan view of a pair of car-trucks with so much of the brake mechanism connected therewith as is required to show the practical embodiment of my invention, the position of the car-body being indicated in broken lines. Fig. 2 is a view of the same in vertical longitudinal section. Fig. 3 is an enlarged view of the equalizer, showing in dotted lines the position which the parts assume when the brake is operated from the left-hand end of the car as the drawing is held. Fig. 4 is a similar view showing in dotted lines the position which the parts assume when the brake is operated from the right-hand end of the car as the drawing is held. Fig. 5 is a view in detail of the two parts of the equalizer. Fig. 6 is a transverse section on the line 6 6 of Fig. 3. Fig. 7 is a transverse section on the line 7 7 of Fig. 3. Fig. 8 is an end view of the hanger-pin and part of the bracket in which it is supported; and Fig. 9 is a longitudinal section through the pin-socket in the bracket, showing the pin and portions of the brake-shoe hangers in position.

The trucks are denoted as a whole by A A'. Each is here shown as consisting of a pair of larger wheels and a pair of smaller wheels, such as are in common use in the trolley-car systems. The brake-shoes are hung in pairs, one pair for each set of wheels, the two pairs of brake-shoes for the truck A being under the control of a rod B, as is common, to draw them simultaneously against the wheels of the truck A, and the two pairs of the truck A' being under the control of the rod B', as is common, to draw them in the opposite direction toward the wheels of the truck A'. The equalizer-bar is composed of two parts or sections (denoted by C C') fulcrumed at a common point $c$ and supported from the car-body. The draw-rods leading to the opposite ends of the car are denoted by D D' and are connected at their outer ends with chains $d$ $d'$, leading to the brake-operating mechanism, as is usual.

The two parts C C' of the equalizer overlap each other at their inner ends, each extending inwardly beyond the common fulcrum $c$. The part C is provided between its outer end and the fulcrum with an elongated slot E and at a point inwardly from the fulcrum with a bolt-hole e for the attachment thereto of the brake-rod B. The part C' is provided intermediate of its outer end and the fulcrum-point with an elongated slot E' and at its inner end with a bolt-hole e' for the attachment thereto of the brake-rod B'. The brake-rods B B' are secured by means of bolts F F', which pass through eyes in the brake-rods B B', through the elongated slots E E', and through the bolt-holes e' e, the bolt F passing through the end of the rod B', the bolt-hole e' in the part C' of the equalizer, and through the slot E in the part C of the equalizer, and the bolt F' passing through the eye in the rod B, through the elongated slot E' in the part C', and through the bolt-hole e in the part C of the equalizer. This structure admits of the part C being moved a little distance by its draw-rod D without disturbing the brake-rod B', but affecting the rod B, and hence partially setting the brake-shoes under the control of the rod B. This limited movement, which affects the brake-rod B, but does not affect the brake-rod B', is intended to be sufficient to offset the forward movement of the body of the car or a little more than offset such forward movement of the body of the car, which for convenience I term the "forward pitch" of the car, at the time the brakes are applied, so that when by the further movement of the part C under the pull on the draw-rod D the brake-rods B B' are both operated the set of brake-shoes at the forward end of the car will impinge the wheels at the same time or a little in advance of the time at which the brake-shoes on the rear truck impinge the wheels of that truck.

It is in practice advisable to have the brake-shoes engage the forward truck a trifle in advance of the engagement of the rear shoes with their truck-wheels, for the reason that the front truck-wheels will admit of a greater pressure on the brake-shoes without becoming skidded than the wheels of the rear truck will admit of because of the additional weight which the forward pitch of the car places upon the wheels of the front truck.

It is desirable that neither set of truck-wheels should become actually skidded on account of the flattening of the wheels which results therefrom. Hence it is desirable that the pressure for stopping the car be distributed so that it shall be the greater on those wheels which sustain the greater weight, and hence are less liable to become skidded. On the other hand, a limited movement of the part C' is permitted without disturbing the brake-rod B until after the brake-rod B' has been moved a little, when the brake is operated from the opposite end of the car, commonly by drawing on the draw-rod D', and the same effect as to distribution of pressure will be produced, save only that the weight being greater upon the truck A' and the pitch of the body of the car being toward the right as the drawing is held the brakes will be applied to the truck A' at or a little ahead of the moment at which they are applied to the wheels of the truck A.

In connection with the pressure of the brake-shoe to the wheel it is important that there should be no lost motion in the joint between the brake-shoe hangers and the pin which supports them, as this permits the brake-shoe to reciprocate up and down on the face of the wheel, producing what is commonly known as "chattering" when the brakes are applied. To prevent this injurious and disagreeable feature, I provide a hanger-pin G, with tapered ends g g'. The pin G is inserted in the bracket-socket H, and the brake-shoe hangers I I' are mounted on the tapered ends g g' of the pin and held in position by means of tapered keys or cotters i i'. Whenever any lost motion occurs between the hangers and the ends of the socket H a slight tap on the keys or cotters i i', one or both, will promptly take up such lost motion and hold the parts securely against chattering.

It is obvious that slight changes might be resorted to in the form and arrangement of the several parts described without departing from the spirit and scope of my invention. Hence I do not wish to limit myself strictly to the structure herein set forth; but—

What I claim is—

1. The combination with the brake and draw rods of a brake mechanism, of an equalizer formed in sections, the said sections having a limited movement relatively to one another for temporarily affecting one brake-rod without temporarily affecting the other, substantially as set forth.

2. The combination with the brake and draw rods, of a brake mechanism, of an equalizer formed in parts or sections each of the parts being under the control of the other part to be moved by it and at the same time being free to move a limited distance without moving the other part, substantially as set forth.

3. The combination with the brake and draw rods of a brake mechanism, of a two-part equalizer, the said parts having a common fulcrum and each overlapping the other, the said parts being each provided with a slot intermediate of their outer ends and their fulcrum and each being provided with a bolt secured to the part in position to extend through the slot in the adjacent part for attaching the brake-rods, substantially as set forth.

In testimony that I claim the foregoing as my invention I have signed my name, in presence of two witnesses, this 8th day of March, 1900.

HARRY SLOAN.

Witnesses:
 FREDK. HAYNES,
 EDWARD VIESER.